March 11, 1969  S. B. HUSS  3,432,377
APPARATUS FOR CONTINUOUSLY LAMINATING WEBS
Filed May 27, 1964

INVENTOR.
STANLEY B. HUSS
BY Morse & Altman
ATTORNEYS

United States Patent Office 3,432,377
Patented Mar. 11, 1969

3,432,377
APPARATUS FOR CONTINUOUSLY LAMINATING WEBS
Stanley B. Huss, 89 Cliff Road, Portsmouth, N.H. 03801
Filed May 27, 1964, Ser. No. 370,640
U.S. Cl. 156—494
Int. Cl. B32b 31/20, 31/12
7 Claims

ABSTRACT OF THE DISCLOSURE

A plastic web is laminated to a fabric web by applying adhesive to one of the webs and guiding them into superimposed relation, heating the plastic web sufficiently to soften it while applying a light vacuum to remove entrained air. The plastic web is longitudinally stretched with respect to the fabric web to insure a smooth application between the two webs during the lamination stage. A high suction is then applied through the fabric web to draw the heat-softened plastic web into intimate contact with the fabric web. The two webs are fed between rollers which press the webs together and the laminated webs are then wound up on a take-up roll. Means are provided for removing the heat source from the web whenever the advance of the web is stopped for any reason. Also adjustment means are provided for selectively varying the angle at which the two webs are brought into face-to-face engagement.

---

Figure 1:
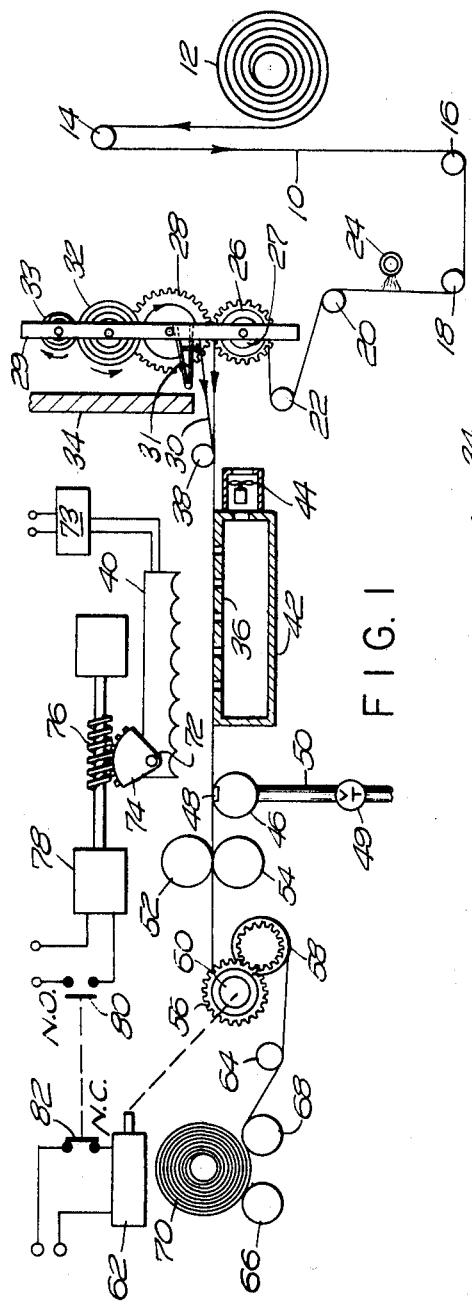

This invention relates generally to the manufacture of laminated flexible webs and more particularly is directed towards a novel method and associated apparatus for continuously laminating a thermoplastic web to a fabric backing.

In the textile industry there is a growing interest in the use of laminated materials for the reason that laminates usually display characteristics which are superior to either of the constituent laminating plies individually. For example, a woven cloth fabric laminated with a vinyl web displays excellent wearing characteristics, is substantially waterproof and can be produced in a variety of attractive finishes by proper selection of the fabric and the vinyl.

Heretofore, thermoplastic and fabric vacuum laminates, particularly those adapted for decorative purposes such as ladies' handbags and the like, have been produced on a more or less piecemeal basis with relatively small sheets being bonded together. However, even on such a limited production basis, the finished laminated product has not been entirely satisfactory because of high cutting waste and cost. Also, the surface of the plastic ply often displays wrinkles and may not adhere properly to the underlying fabric backing, nor show the character or the identical configuration of the fabric surface.

Accordingly, it is an object of the present invention to provide improvements in the manufacture of fabric and plastic laminates.

Another object of this invention is to provide a novel method for continuously laminating thermoplastic webs to woven materials or porous fabrics, particularly of paper.

Still another object of this invention is to provide a novel apparatus for continuously laminating a thermoplastic web to a fabric web.

A still further object of this invention is to provide a novel method and associated apparatus for laminating on a continuous basis a web of thermoplastic material to a fabric web whereby the plastic web will be intimately bonded to the fabric and will conform precisely to the surface contours of the fabric.

More particularly, this invention features the method of continuously laminating a thermoplastic web to a fabric web comprising the steps of applying a bonding medium to one surface of a fabric web, longitudinally feeding a thermoplastic web into superposition over the coated fabric surface in a stretched condition while longitudinally feeding the fabric web in the same general direction as the thermoplastic web heating the thermoplastic web sufficiently to soften it and applying a high vacuum to the fabric side of the laminated webs to draw the thermoplastic web tightly down against the fabric web to intimately unite the two webs.

This invention also features an apparatus for continuously applying a lengthwise tension on a longitudinally moving thermoplastic web while bringing it into laminating engagement at an elevated temperature to an opposing fabric backing which is also moving longitudinally in the same general direction as the thermoplastic web. This apparatus also includes a novel arrangement for removing bubbles and the like from the web interfaces which may interfere with full and intimate bonding between the laminated plies.

Figure 2:
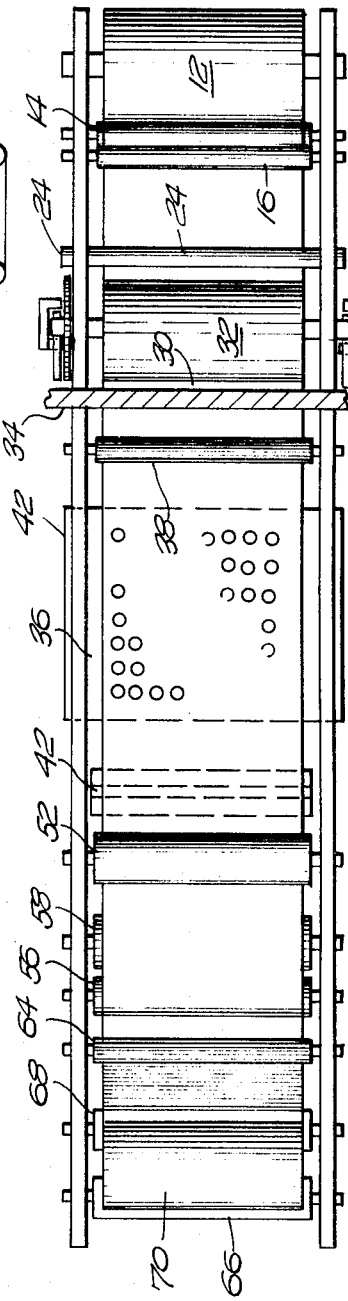
Figure 3:
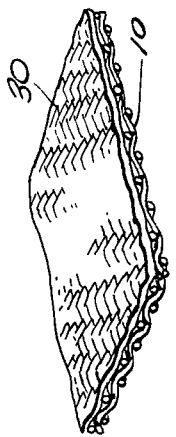

But these and other features of the invention, along with further objects and advantages thereof, will become more fully apparent from the following detailed description of a preferred embodiment of the invention with reference being made to the accompanying drawings, in which:

FIG. 1 is a view in side elevation somewhat schematic of a web laminating apparatus made according to the invention, FIG. 2 is a top plan view thereof, and FIG. 3 is a view in perspective of a two-ply laminate made in the practice of this invention.

Referring now to the drawings, the reference character 10 generally indicates a web of fabric such as woven paper strips or cloth, for example, fed from a supply roll 12 and roven over a guide roll 14 and a series of idler rolls 16, 18, 20 and 22. Preferably, these idler rolls are covered with a tough plastic material such as that sold under the trademark Teflon. The fabric web 10 is carried past a coating station which includes a spray tube or nozzle 24 adapted to spray a continuous coating of a cementitious liquid onto one surface of the web. In practice, a water base cement has been found suitable for this purpose, although a variety of other adhesives may be employed to advantage.

From the spraying station, the now coated fabric web 10 is threaded over a relatively large diameter roller 26 preferably having a perforated tin roll covering to prevent slipping between the web and the roller surface. The roller 26 is also provided with an adjustable slip clutch 27 which serves as a convenient means for controlling the tension on the fabric web. Mounted directly above the roller 26 and in slightly spaced parallel relation is another roller 28 which is geared with the roller 26 in such a manner as to rotate at a slower speed than the roller 26. The covering on this roller preferably should have a high coefficient of friction and in practice a rubber tape surface has been found satisfactory for this purpose. The gears connecting the two rollers are replaceable to obtain the best tension for particular materials. Carried about the roller 28 is a web 30 of thermoplastic material, such as vinyl or the like, which is unrolled from a supply roll 32 disposed directly upon the roller 28.

The roller 28 is supported at its ends to upright channel member 29 by means of adjustable hinges 31 by which the roller 28 may be raised or lowered. This permits control over the angle at which the thermoplastic web joins the fabric web as it enters the heating zone. This angle may thus be selectively varied to obtain the optimum angle of entry which may vary between different materials. The roller 26 may also be adjusted by a similar mechanism to obtain the best angle of entry for two particular webs.

Normally, the rolls 32 of thermopalstic material are wound in double layers with the finished surfaces wound face to face for protection. The main roll 32 is thus mounted to the channel member 29 and rests on top of the roller 28. A second roller 33 is also mounted to the channel member 29 to take up one of the plastic plies as the other is being fed through the machine. This take up roll rests on top of the roll 32 and winds up automatically as the main roll is unwound. When the main roll is completely unwound, the roll 33 is moved into the position of the roll 32 where it is then unwound into the machine.

From the two rollers 26 and 28 the two webs are drawn one to another into the same path beneath a reflective aluminum barrier 34, over a perforated vacuum table 36 and under Teflon coated idler roller 38. It will be understood that the thermoplastic web 30 at this point is in surface to surface contact with the adhesive coated surface of the fabric web 10 with the thermoplastic web 30 being longitudinally tensioned by the action of the gearing arrangement between the rollers 26 and 28 and the friction clutch associated with the roller 26. With this arrangement, the fabric web will be moving forward in a longitudinal direction faster than the thermoplastic web 30 by perhaps 3–15% depending on the characteristics of the particular plastic being fed into the apparatus.

Disposed directly above the table 36 is an array of heating elements such as infra-red lamps or calrods 40 which normally are directed downward so as to heat and soften the thermoplastic web passing thereunder. The height of the heating elements above the two webs may be adjusted for optimum results.

As the thermoplastic web is brought against the coated fabric web by means of the roller 38, bubbles may form under the action of the applied heat from the array of heating elements. These bubbles may form in the interface between the two plies and, if not removed, would produce an irregular finish and impair the bond between the two webs. These bubbles are removed by means of the table 36 which is part of a vacuum box 42 typically maintained at a very light vacuum perhaps 0.1″ Hg or so. This light vacuum may be obtained by means of a man 44 mounted in the wall of the box. The function of the perforated table 36 provides a means for relieving the pressure built up between the two webs. This vapor pressure differential can be made more effective by the fan exhaust to insure that any bubbles formed between the two webs will be broken and thus make possible a smooth continuous bonding surface through the removal of the vapors from the cement generated by the heat. This holds the fabric in position.

As the thermoplastic web 30 passes under the heating elements, it first becomes soft and somewhat limp and increases somewhat in lateral and longitudinal dimensions. By stretching the plastic longitudinally prior to bonding it to the fabric, the plastic is applied in a smooth and wrinkle free condition which would not be the case if the material were merely heated and draped onto the fabric. By tensioning the thermoplastic material longitudinally, the problem of wrinkling is overcome with the added advantage of being able to control to a certain extent the thickness of the applied thermoplastic web depending upon the longitudinal tension applied to this web. It will be understood that the greater the tension on the thermoplastic web, the more it will be stretched and the thinner will be the resulting laminated ply.

Mounted next to the suction box 42 and at the end of the heating zone is a fixed tube 46 formed with a slot 48 along its upper edge and bearing against the underside of the fabric web. 10. The tube 46 is connected through a valve 49 and conduit 50 to a vacuum pump which is adapted to maintain a relatively high vacuum within the tube. The vacuum level at the tube 46 may be controlled by throttling the valve 49 until the desired operation level is obtained. This vacuum typically is on the order of 12 to 22″ Hg and serves to pull the softened thermoplastic web down and partly through the fabric web causing the plastic to intimately unite with the fabric and to fill the interstices of the fabric so that it conforms exactly to the texture, configuration and surface contours of the fabric. In practice, a relatively low vacuum is needed where the fabric web 10 is a porous material such as an open weave paper mesh fabric, for example, whereas a relatively high vacuum will be required for dense, closely woven materials. In place of the fixed slotted tube 46, a rotatable vacuum roller may be employed to reduce friction between the web and the vacuum device.

As the now laminated webs leave the vacuum tube, they move at the same speed since the lamination is completed. Once out of the vacuum station, the laminated web is preferably passed between a pair of press rolls 52 and 54, the upper of which preferably is coated with neoprene rubber or other suitable resilient material while the lowermost roll has a hard outer surface and typically is fabricated from steel or the like. The press rolls insure that the two webs are firmly united at the highest spots, and more particularly insure a smooth surface to the touch while retaining the definition of the fabric texture. The use of the resilient upper roll does not mar the surface characteristics which the thermoplastic material has taken on by having been heated and vacuum laminated to the underlying fabric web.

From the press rolls, the laminated webs are threaded over and around a pair of drive rolls 56 and 58 spaced about ½″ apart and geared together in a manner similar to the rolls 26 and 28. In other words, the roller 58 is geared to rotate about 20% faster than the roller 56 in order to maintain tension on the laminated web. In practice, the roll 56 has a cylindrical tin roll surfacing while the roll 58 has a ½″ thick felt outer surface since the latter roll engages the plastic side of the laminated web and the felt surface prevents marring of the plastic. The effective diameter of the roll 58 is 1″ greater than the roll 56. The roll 56 is also provided with a friction clutch 60 in the same fashion as the roller 26 previously described. The drive for the roll 56 is provided by means of a reversible motor 62 as shown schematically in FIG. 1. By reversing the feed the webs may be manually pulled back through the machine in case certain portions are not properly laminated by the first pass. It will be understood that the drive rolls provide all of the drive for pulling the two webs from their supply rolls through the heating stations and over the vacuum tube. The clutch serves to smooth out the motion of the webs and provide slip in an emergency or when the webs become taut.

From the drive rolls, the laminated web is carried under an idler roll 64 and onto a surface winder comprising a pair of rolls 66 and 68 with the roller 66 being power driven at a speed faster than the drive roll 56. The roller 66 typically may be smooth or covered with a rubber jacket or the like while the roll 68, in practice, has a tin roll surface. The roll 68 provides the rotative force for winding the laminated web into a roll 70.

Since it may become necessary from time to time to stop the feed of the webs, the array of heating elements 40 is mounted on a pivot 72 so that the elements may be swung up and away from the plastic web. It will be understood that if the movement of the web is stopped for any appreciable time, even if turned off the residual heat in the elements would cause excessive heating of the plastic. For this reason when the web stops the array is mounted to be swung 100° out of the way. The reflective heat shield 34 is provided to shield the rolls 32 and 33 when the heating elements are in a raised position. The heating elements themselves are controlled by a variable timing device 73 adaped to deliver current to the elements in timed intervals which may be varied from 0–100% of operating time. It will be understood that the temperature of the elements may be raised by setting the timer to deliver current at more frequent intervals as desired. The particular setting on the timer will depend upon the characteristics of the particular thermoplastic web being processed.

In practice, the array of heating elements may be moved manually out of the way or by an automatic arrangement such as shown in FIG. 1. This automatic control includes a gear sector 74 mounted on the heating element support and in mesh with a worm 76. The worm in turn is rotated by a reversible motor 78 connected to a suitable power source through a normally open switch 80. The switch 80 is operatively connected to a normally closed switch 82 in the drive motor circuit 32. It will be understood that when the drive motor is stopped and the circuit opened, the normally open switch 80 for the motor 78 will be closed to rotate the worm and bias the array of heating elements up and out of the way. Suitable limit switches may be employed to control the movement of the heating elements.

In FIG. 3 there is shown a section of laminated fabric and plastic plies and it will be seen that two plies are intimately bonded to one another with the plastic web closely conforming to the surface contours of the underlying fabric and generally filling the interstices of the fabric so that the surface of the plastic follows intimately the configuration of the web but with improved wearing characteristics not possible with ordinary roll laminations.

The finished laminated material is tough and flexible and is characterized by a pleasing and unusual appearance, which makes it suitable for use in ladies' handbags, shoe uppers or other applications of this type.

The process and apparatus are adapted to laminate on a continuous basis with a resulting high rate of production. The finished materias are superior both in appearance and in quality over laminates made by batch techniques and yet because of the high rate of productivity the materials may be processed at a lower cost. In practice it has been found that the laminate characteristics are effected by the speed of the materials through the system, the amount of heat applied to the plastic web, the distance of the heating elements from the plastic web, the vacuum pressure, the stretch on the plastic web and the angle at which the two webs join. Different plastics and fabrics will display different characteristics which require adjustment of one or more components in order to achieve optimum operating conditions for a particular combination of plastic and fabric webs.

While the invention has been described with particular reference to the illustrated embodiment, it will be understood that numerous modifications thereto will appear to those skilled in the art. Also, it will be understood that the above description and accompanying drawings should be taken as illustrative of the invention and not in a limiting sense.

Having thus described the invention, what I claim and desire to obtain by Letters Patent of the United States is:

1. Apparatus for laminating a thermoplastic web to a fabric web, comprising:
   (a) means for longitudinally advancing both of said webs,
   (b) means for applying an adhesive stratum to one surface of said fabric web,
   (c) feed means for longitudinally stretching said thermoplastic web,
   (d) guide means for feeding said thermoplastic web into superposition over the adhesive coated surface of the fabric web,
   (e) heating means disposed adjacent the path of travel of said thermoplastic web for softening said thermoplastic web, and
   (f) vacuum means disposed adjacent the path of travel of said fabric web for applying a vacuum through said fabric web to thereby pull said thermoplastic web against the coated surface of said fabric web.

2. Apparatus according to claim 1 wherein said heating means is mounted for movement to and away from a position adjacent to the path of travel of said thermoplastic web.

3. Apparatus according to claim 1 including means for selectively varying the angle at which said webs are joined in superposition relation.

4. Apparatus according to claim 1 including means for selectively varying the speed of advance of said webs.

5. Apparatus according to claim 1 including means for selectively varying the tension on said thermoplastic web.

6. Apparatus for continuously laminating a thermoplastic web to a fabric web, comprising:
   (a) means for advancing both of said webs in a longitudinal direction,
   (b) spray means disposed adjacent to the path of travel of said fabric web for applying an adhesive stratum to one surface of said fabric web,
   (c) web feeding means for longitudinally tensioning said thermoplastic web,
   (d) web guiding means for feeding said thermoplastic web into superposition over the adhesive coated surface of the fabric web,
   (e) heating means disposed adjacent the path of travel of said thermoplastic web for heating and softening said thermoplastic web,
   (f) first vacuum means disposed adjacent the path of travel of said fabric web for applying a controlled and relatively low vacuum to said fabric web to remove vapor and heated air buildup, and
   (g) second vacuum means disposed adjacent the path of travel of said fabric web and subsequent to said first vacuum means for applying a controlled and relatively high vacuum through said fabric web to thereby pull said thermoplastic web against the coated surface of said fabric web.

7. An apparatus according to claim 6 including means for moving said heating means to and away from the path of travel of said thermoplastic web.

References Cited

UNITED STATES PATENTS

| 2,660,757 | 12/1953 | Smith et al. | 264—92 |
| 2,706,699 | 4/1955 | Plansoen et al. | 156—324 |
| 2,890,146 | 6/1959 | Unsworth | 156—148 X |
| 3,042,573 | 7/1962 | Roberts | 156—285 |

EARL M. BERGERT, *Primary Examiner.*

H. F. EPSTEIN, *Assistant Examiner.*

U.S. Cl. X.R.

156—499